United States Patent
Nimmagadda

(10) Patent No.: US 9,014,366 B2
(45) Date of Patent: Apr. 21, 2015

(54) DETERMINING EXPECTED WAIT TIME

(75) Inventor: Krishna Karthik Nimmagadda, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 242 days.

(21) Appl. No.: 13/189,474

(22) Filed: Jul. 22, 2011

(65) Prior Publication Data

US 2013/0022195 A1 Jan. 24, 2013

(51) Int. Cl.
 *H04M 3/00* (2006.01)
 *H04M 3/523* (2006.01)
(52) U.S. Cl.
 CPC .................... *H04M 3/5238* (2013.01)
(58) Field of Classification Search
 CPC ..... H04M 3/51; H04M 3/523; H04M 3/5175; H04M 3/5185; H04M 3/5238; H04M 3/5183; H04M 3/5232; H04M 3/33
 USPC .............................. 379/266.1, 265.1, 265.11, 379/266.06–266.07
 See application file for complete search history.

(56) References Cited

U.S. PATENT DOCUMENTS

| | | | |
|---|---|---|---|
| 5,506,898 A | | 4/1996 | Costantini et al. |
| 6,490,350 B2 * | | 12/2002 | McDuff et al. ........... 379/265.06 |
| 6,728,363 B2 | | 4/2004 | Lieberman et al. |
| 2007/0211879 A1 * | | 9/2007 | Shaffer et al. ............ 379/265.01 |
| 2009/0074166 A1 | | 3/2009 | Pavlic et al. |
| 2012/0101867 A1 * | | 4/2012 | Zgardovski et al. ......... 705/7.15 |
| 2012/0321070 A1 * | | 12/2012 | Smith et al. .............. 379/265.09 |

* cited by examiner

*Primary Examiner* — Rasha Al Aubaidi
(74) *Attorney, Agent, or Firm* — IP Spring

(57) ABSTRACT

Embodiments for managing customer wait time at a call center are provided. In one embodiment, a system includes a switch having a software engine that determines the customer wait time, a computing device executing a work force optimization (WFO) software module, such that the software engine transmits a query to the WFO software module. In one embodiment, the WFO software module transmits a number of unlogged agents and a next shift time in response to the query, and such that the software engine determines the customer wait time based on the number of unlogged agents and the next shift time.

19 Claims, 4 Drawing Sheets

DETERMINING EXPECTED WAIT TIME

BACKGROUND

The disclosure relates generally to telecommunication systems and more specifically to systems, devices, and methods to determine an estimated wait time in a telecommunication system.

Companies may provide telephone based access to provide assistance to their customers, employees, sales personnel, and other representatives. Typically a switching system such as a private branch exchange (PBX) system is implemented to receive and distribute each call to an automatic call distributor (ACD). ACDs are often employed to provide an even and systematic distribution of calls to multiple representatives. In particular, ACDs typically route incoming calls to an available representative or agent. However, if all agents are busy and/or attending to other calls, the ACD system places the incoming call in a call queue, and connects the call only when an agent becomes available. In some ACD systems, an expected wait time may also be computed and communicated to the caller. The expected or estimated wait time refers to the time a caller has to wait in the queue before an agent is available to attend to the caller.

SUMMARY

Embodiments for managing customer wait time at a call center are provided. In one embodiment, a system includes a switch having a software engine to determine the customer wait time, a computing device executing a work force optimization (WFO) software module wherein the software engine transmits a query to the WFO software module. In one embodiment, the WFO software module transmits a number of unlogged agents and a next shift time in response to the query, and the software engine determines the customer wait time based on the number of unlogged agents and the next shift time.

In another embodiment, a device for managing customer wait time at a call center is provided. The device includes a switch having a software engine to determine the customer wait time. The software engine is configured to transmit a query to a software module and receives a number of unlogged agents and a next shift time in response to the query parameter. The software engine then determines the customer wait time based on the number of unlogged agents and the next shift time.

In another embodiment, a method for managing customer wait time at a call center is provided. The method includes transmitting a query, by a software engine residing on a switch, to a software module, receiving a number of unlogged agents and a next shift time in response to the query by the software engine and determining the customer wait time based on the number of unlogged agents and the next shift time by the software engine.

In another embodiment, a device for managing customer wait time at a call center, is provided. The system comprising a computing device executing a work force optimization (WFO) software module, wherein the WFO software module transmits a number of unlogged agents and a next shift time in response to a query to determine the customer wait time based on the number of unlogged agents and the next shift time.

In another embodiment, a system for managing customer wait time at a call center is provided. The system includes a switch having a software engine to determine the customer wait time, a computing device executing a work force optimization (WFO) software module. The software engine is configured to transmit a query to the WFO software module, the WFO software module transmits a number of replacement agents and a next shift time in response to the query parameter, and the software engine determines the customer wait time based on a number of active agents, the number of replacement agents, and the next shift time.

In another embodiment, a method for managing customer wait time at a call center is provided. The method includes transmitting a query, by a software engine residing on a switch, to a software module, receiving a number of replacement agents and a next shift time in response to the query by the software engine and determining the customer wait time based on a number of active agents, the number of replacement agents, and the next shift time by the software engine.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
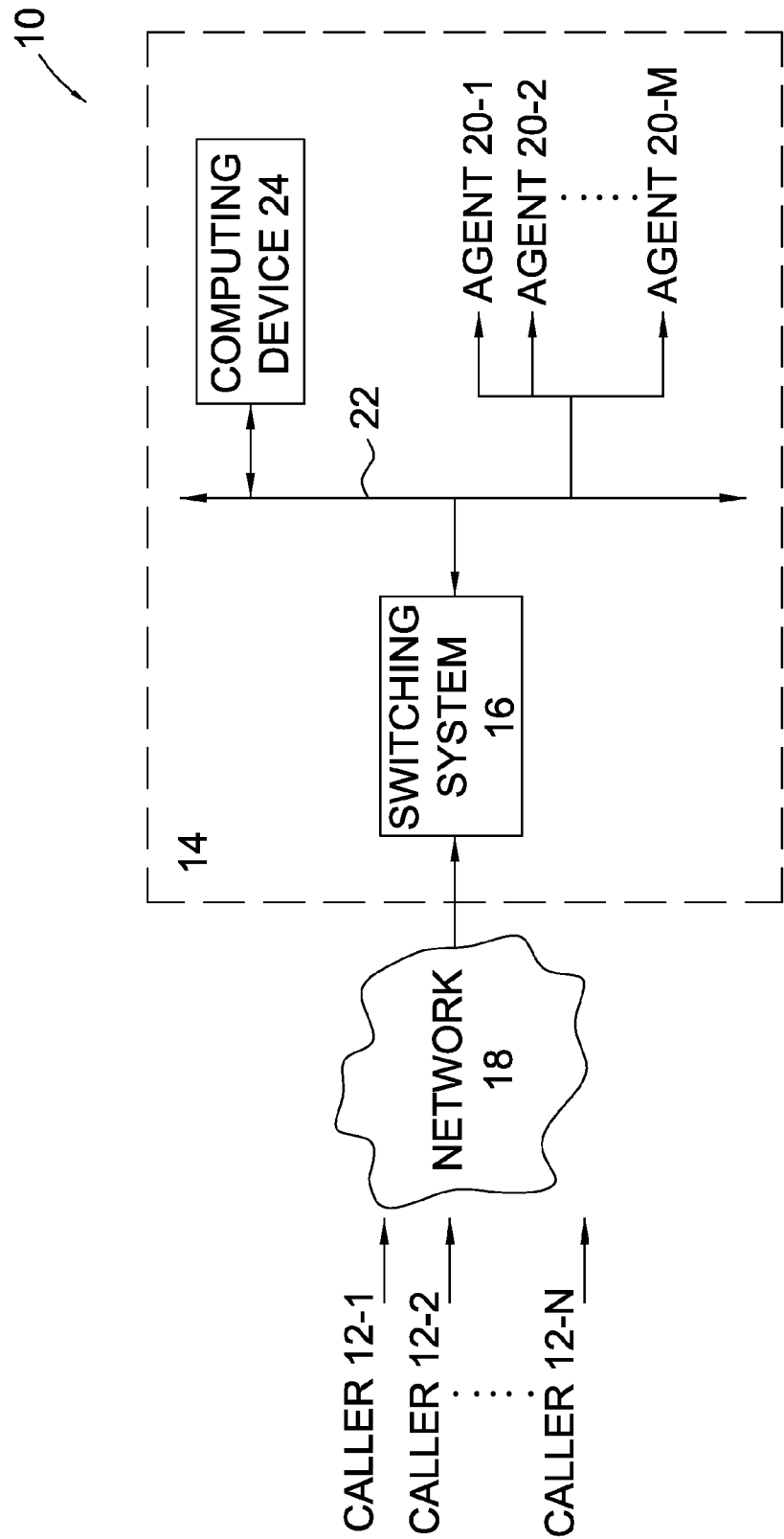
FIG. 1 is a block diagram of an example call center environment implementing techniques according to aspects of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Conventional estimated wait time calculation schemes can be subject to significant inaccuracies, particularly if used in conjunction with a service representative work force that changes over various time periods throughout the day. For example, consider a contact center having 10 active representatives who have logged-in at 10:00 PM. Another set of 10 representatives is due to login to the system at 11:00 PM. The average call handling time (AHT) for each representative is 10 minutes. In this scenario, if an eleventh call is received between 10:55 PM and 11:00 PM, the queue switch would estimate the expected wait time based on AHT or based on other predictive algorithms that consider logged-in agents only (in this case only 10) while calculating the estimated wait time. The system does not account for the next set of representatives that are available from 11 PM. Thus, the estimated wait time computed by such systems would be higher than the actual wait time as the system does not consider the representatives that are due to login to the system at 11 PM.

The pending disclosure describes systems, devices, and methods for improving the accuracy of a wait time calculation and, more particularly, improving the accuracy of a wait time calculation in an environment wherein, for example, a work force changes over various time periods throughout the day.

FIG. 1 is an example call center environment in which aspects of the present disclosure are implemented. Callers 12-1 through 12-N can connect to the call center 14 via a telephone network 18. In one embodiment, the network 18 includes a public switched telephone network (PSTN). PSTN is a worldwide telephone system that provides telephone call connections, including telephone connections to the call center 14. The call center 14 includes a switching system 16 among other modules. In the illustrated embodiment, the switching system 16 may be a private branch exchange (PBX).

The switching system 16 is configured to route incoming telephone calls from callers 12-1 through 12-N to intended call recipients, such as agents 20-1 through 20-M. The switching system 16 includes several modules that can provide call queuing and automatic wait handling of incoming telephone calls. In one embodiment, the switching system 16 includes a communication interface (not shown) that serves as an interface between the callers and the switching system 16.

In one embodiment, each of the agents 20-1 through 20-M have access to agent telephones and agent computers that assist the agent to resolve an issue reported by the caller. Communication network 22 is provided to couple the switching system 16, the agent computers, an application server, a database server, a web server, email server and other such modules in the call center. Communication network 22 can correspond, for example, to an Ethernet local area network.

Computing device 24 is in communication with the switching system 16 via communication network 22. In one embodiment, the computing device 24 includes a work force optimization (WFO) software module. The WFO software module is configured to provide information about the number of unlogged agents and the shift times, including the next shift time, of the unlogged agents. In one embodiment, the WFO software module dynamically updates information about a number of agents logged into the call center at a particular time and also includes information about the various shift times in the call center.

Switching system 16 is configured to compute a customer wait time for each caller connected to the call center 14. The switching system 16 includes a software engine that is in communication with the WFO software module. In one embodiment, the switching system 16 receives information on a number of unlogged agents and a next shift time of the number of unlogged agents.

The switching system 16 is configured to determine a customer wait time based on the number of unlogged agents and the next shift time. In one embodiment, the next shift time is less than a query parameter which may be a configurable threshold value representing a time period. In another embodiment, if the next shift time is more than the query parameter then the customer wait time is not calculated to take into account the unlogged agent for the next shift. In other embodiments, customer wait time calculation methods may include probabilistic methods as well as deterministic methods. The switching system is further configured to communicate the computed customer wait time to the caller. In one embodiment, the customer wait time is communicated to the caller through a caller communication interface (not shown).

Figure 2:
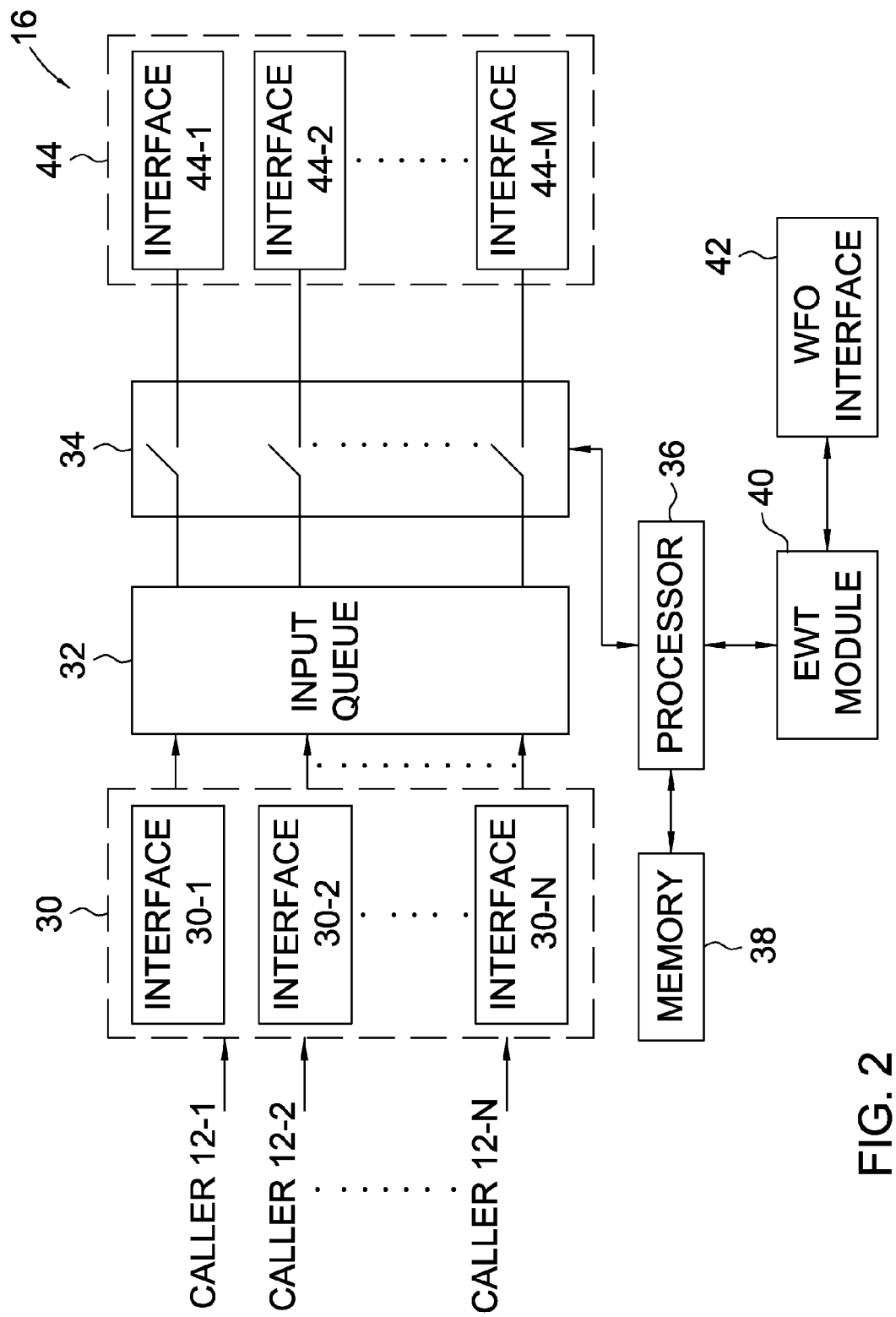
FIG. 2 is a block diagram of one embodiment of a switching system implemented according to aspects of the present disclosure.

Referring to FIG. 2, a block diagram of one embodiment of a switching system implemented according to aspects of the present disclosure. Switching system 16 is configured to compute a customer wait time for each caller logged into the system.

Caller communication interface 30 includes a plurality of caller interfaces 30-1 through 30-N and serves as an interface between the caller and the switching system 16. In one embodiment, each caller communication interface includes one or more interactive voice response (IVR) systems. The IVR is configured to provide voice queries to a telephone caller. Voice queries typically direct the telephone caller through a series of selections that can be chosen by the telephone caller via button pushes on a telephone keypad.

Each of the caller interfaces 30-1 through 30-N is configured to connect a respective call to an input queue 32. The input queue 32 is coupled to switch bank 34. In one embodiment, the switch bank 34 includes a plurality of switches. The switch bank 34 is coupled to an agent communication interface 44. Further, each agent communication interface is coupled to an agent. The agent communication interface 44 includes a plurality agent interfaces 44-1 through 44-M. The switch bank 34 is configured to couple a caller to an available agent according to instructions received from processor 36.

The processor 36 is configured to execute a plurality of instructions stored in a memory 38 to perform functions of the switch bank 34. Memory 38 is coupled to processor 36 and stores data for use in the operation of switching system 16. As can be seen in the illustrated embodiment, the processor 36 and the memory 38 reside within the switching system 16. However, it should be apparent to those skilled in the art that the process performed in accordance with this disclosure can be used by any type of processing unit that routes calls present externally to the switching system 16.

Estimated wait time module 40 is coupled to the processor 36 and is configured to compute a customer wait time for each call in the input queue. In one embodiment, the estimated wait time module 40 is configured to compute the customer wait time for each caller based on the number of unlogged agents and the next shift time. The customer wait time is computed using probabilistic methods, statistical models, deterministic methods or combinations thereof.

Estimated wait time module 40 is configured to receive information about the number of active agents, number of unlogged agents, and details of the various shift times of the call center from a work force optimization (WFO) module residing in a computing device. The estimated wait time module 40 interacts with the WFO module residing in a computing device, such as the computing device 24 of FIG. 1, via a WFO interface 42.

In one embodiment, the customer wait time module 40 is configured to send a query to the WFO module. On receiving the query, the WFO module is configured to send requested information in the query such as number of active agents, number of unlogged agents, and details of the various shift times of the call center to the customer wait time module 40. In one embodiment, a query parameter is configured on the customer wait time module 40 and is a threshold value representing a time period. The customer wait time is determined based on the number of unlogged agents when the next shift time is less than the query parameter. As described earlier, the WFO module resides in a computing device.

Figure 3:
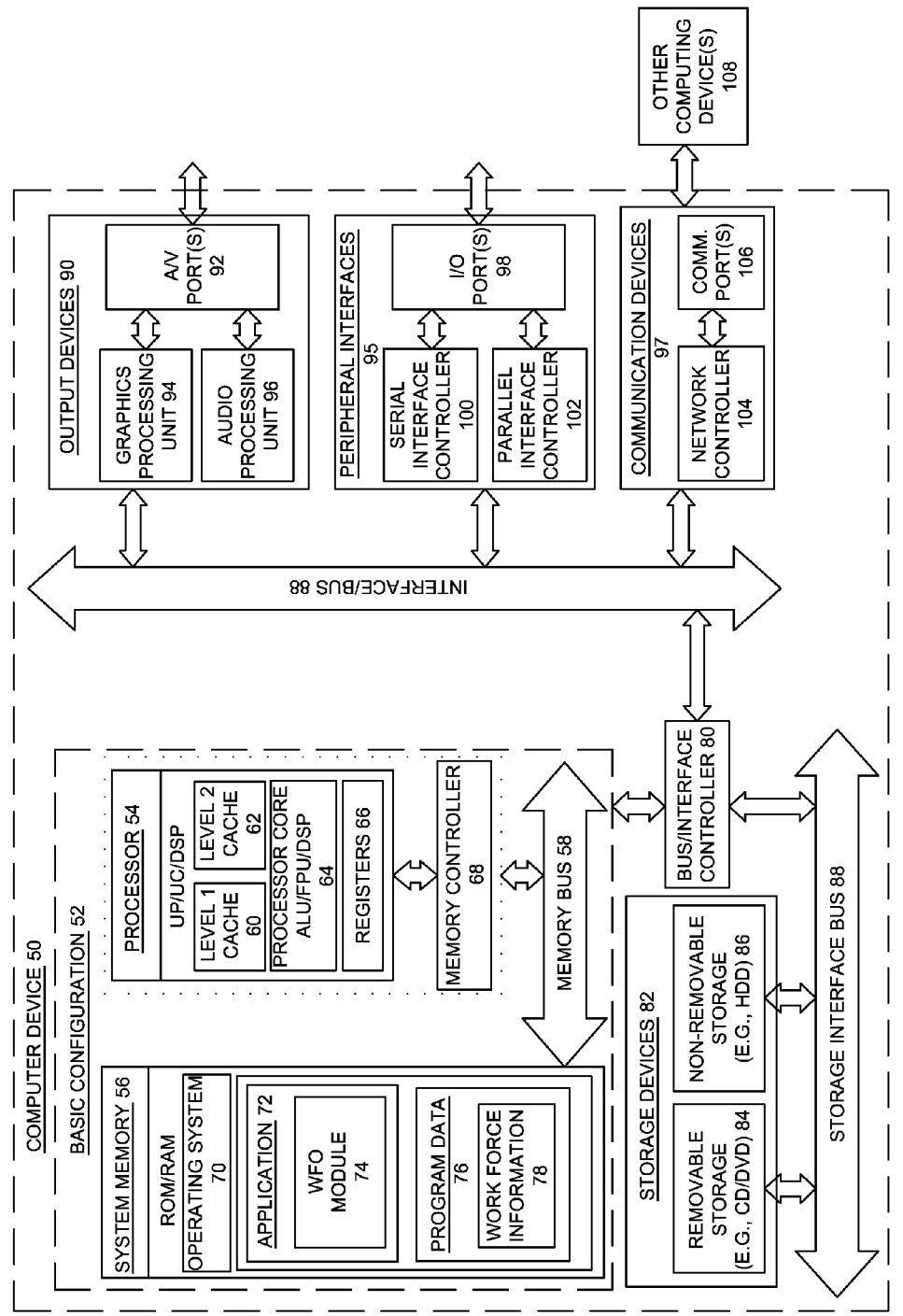
FIG. 3 is a block diagram illustrating an example computing device that may be arranged for transmitting information regarding a call centre in accordance with the present disclosure.

FIG. 3 is a block diagram illustrating an example computing device or computer device 50 that may be arranged to transmit information regarding a call center in accordance with aspects of the present disclosure. In an example basic configuration 52, computing device 50 typically includes one or more processors and a system memory 56. A memory bus 58 may be used for communicating between processor 54 and system memory 56.

Depending on the desired configuration, processor 54 may be of any type including but not limited to a microprocessor (µP), a microcontroller (µC), a digital signal processor (DSP), or any combination thereof. Processor 54 may include one more levels of caching, such as a level one cache 60 and a level two cache 62, a processor core 64, and registers 66. An example processor core 64 may include an arithmetic logic unit (ALU), a floating point unit (FPU), a digital signal processing core (DSP Core), or any combination thereof. An example memory controller 68 may also be used with processor 54, or in some implementations memory controller 58 may be an internal part of processor 54.

Depending on the desired configuration, system memory 56 may be of any type including but not limited to volatile memory (such as RAM), non-volatile memory (such as ROM, flash memory, etc.) or any combination thereof. System memory 56 may include an operating system 70, one or more applications 72, and program data 76. Application 72 may include a work force optimization (WFO) module 74. Program data 76 may include work force information 78 that are representative of the number of agents logged into a call center, shift timings, number of unlogged agents, etc. In some embodiments, WFO module 74 may be arranged to operate with program data 76 on operating system 70.

Computing device 50 may have additional features or functionality, and additional interfaces to facilitate communications between basic configuration 52 and any required devices and interfaces. For example, a bus/interface controller 88 may be used to facilitate communications between basic configuration 52 and one or more data storage devices 82 via a storage interface bus 88. Data storage devices 82 may be removable storage devices 84, non-removable storage devices 88, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 56, removable storage devices 84 and non-removable storage devices 86 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 50. Any such computer storage media may be part of computing device 50.

Computing device 50 may also include an interface bus 88 for facilitating communication from various interface devices (e.g., output devices 90, peripheral interfaces 95, and communication devices 96) to basic configuration 52 via bus/interface controller 80. Example output devices 90 include a graphics processing unit 94 and an audio processing unit 96, which may be configured to communicate to various external devices such as a display or speakers via one or more A/V ports 92. Example peripheral interfaces 95 include a serial interface controller 100 or a parallel interface controller 102, which may be configured to communicate with external devices such as input devices (e.g., keyboard, mouse, pen, voice input device, touch input device, etc.) or other peripheral devices (e.g., printer, scanner, etc.) via one or more I/O ports 98. An example communication device 103 includes a network controller 104, which may be arranged to facilitate communications with one or more other computing devices 108 over a network communication link via one or more communication ports 106.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 50 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 50 may also be implemented as a personal computer including both laptop computer and non-laptop computer configurations.

Referring to FIG. 1 and FIG. 2, the switching system is configured to compute a customer wait time based on inputs received from the computing device 50.

Figure 4:
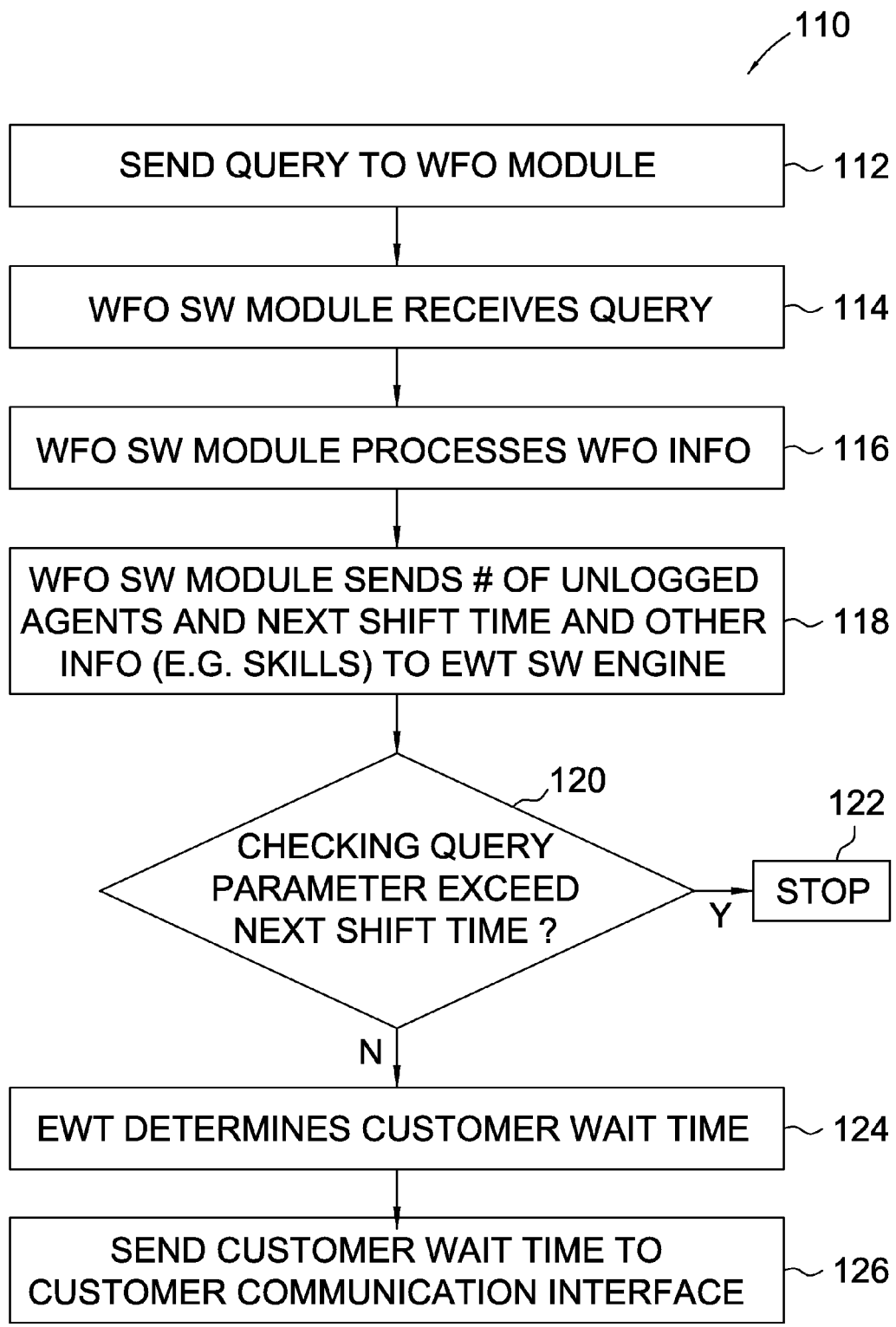
FIG. 4 is an exemplary flow chart depicting one example method by which a customer wait time is computed according to aspects of the present disclosure.

FIG. 4 is a flow chart depicting one example method by which a customer wait time is computed according to aspects of the present disclosure. The customer wait time is computed by using information transmitted by a WFO module residing in the computing device. At block 112, a query is transmitted to the work force optimization (WFO) module. In one embodiment, the WFO module is a software engine residing in a computing device. The WFO module includes information regarding the number of active agents in the system, the number of unlogged agents and the various shift times.

At block 114, the WFO module receives the query from a switching system (e.g. PBX). At block 116, the WFO module processes the query. At block 118, the WFO module transmits the requested information in the query to an estimated wait time (EWT) module residing in the switching system. The information transmitted may include, a total number of unlogged agents, shift times (e.g. next shift time of unlogged agents), one or more skills associated with each of the unlogged agents of the next shift, a total number of active agents, and the like.

At block 120, the query parameter is compared to the next shift time received from the WFO module to determine if the query parameter exceeds the next shift time. When the query parameter exceeds the next shift time, the process moves to block 122 and stops, as represented by reference numeral 122. Thus, estimated wait time may be calculated without taking into account the number of unlogged agents for the next shift. When the query parameter does not exceed the next shift time, the process moves to block 124.

At block 124, the estimated wait time module determines the customer wait time. In one embodiment, the customer wait time is computed based on the number of unlogged agents and the next shift time of the unlogged agents. The customer wait time can be determined based on the one or more skills associated with each of the unlogged agents. The customer wait time can be calculated using statistical models, probabilistic models, deterministic models and the like.

At block 126, the customer wait time is communicated to the caller via a communication interface. The manner in which the customer wait time is computed is described below with an example.

Consider a call center with shifts attended by agents at an interval of one hour from 6 PM to 3 AM (for example, 6 PM, 7 PM, 8 PM and so forth). It is assumed that for each shift, 10 agents login and the query parameter threshold value is set to 120 seconds. It is further assumed that at a given time, for example at 8:57 PM, the number of calls waiting in the queue is 0 and the total number of active agents are 28 and 2 agents are unavailable. At 8:58:05, if 3 calls arrive in the queue, a customer wait time is calculated for each call. The switching system transmits a query to the WFO module for the next shift. As the time for next shift is less than the threshold value compared to the current time, the switch considers availability of agents from next shift while calculating customer wait time.

Thus, the customer wait time without considering unlogged agents is 4 minutes, but by considering unlogged agents it is less than 2 minutes. As can be seen, the present technique computes a more accurate customer wait time that is less than if the unlogged agents were not considered thus helping the business to retain a customer and possibly turn a call in to a sale or improve customer satisfaction.

The difference in EWT values with and without considering the unlogged agents is substantial and will be very useful when there are calls waiting in the queue and during high call volumes. Factoring in unlogged agents as part of EWT calculation can help improve customer satisfaction and reduce call abandon rates.

As will be appreciated by those of ordinary skill in the art, the foregoing example, demonstrations, and process steps may be implemented by suitable code on a processor-based system. It should also be noted that different implementations of the present technique may perform some or all of the steps described herein in different orders or substantially concurrently, that is, in parallel.

Furthermore, the functions may be implemented in a variety of programming languages, such as C++ or JAVA. Such code, as will be appreciated by those of ordinary skill in the art, may be stored or adapted for storage on one or more tangible, machine readable media, such as on memory chips, local or remote hard disks, optical disks (that is, CD's or DVD's), or other media, which may be accessed by a processor-based system to execute the stored code.

While only certain features of embodiments of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for managing customer wait time at a call center, the system comprising:
   a switch having a software engine to determine the customer wait time for each of one or more callers;
   a computing device executing a work force optimization (WFO) software module,
   wherein the software engine transmits a query to the WFO software module, the WFO software module transmits a number of unlogged agents of a next shift and a next shift time in response to the query, and the software engine determines the customer wait time corresponding to each of the one or more callers based on a number of logged agents and conditionally based on the number of unlogged agents and the next shift time, wherein the number of unlogged agents and the next shift time are included in the determination of the customer wait time based on a result of a comparison of the next shift time and a query parameter, the query parameter being equal to a threshold value representing a time period and stored by the software engine; and
   a customer communication interface that communicates the corresponding customer wait time to each of the callers.

2. The system of claim 1, wherein the switch includes one or more communication interfaces coupled to a communication network.

3. The system of claim 1, wherein the computing device includes one or more communication interfaces coupled to a communication network.

4. The system of claim 1, wherein the query parameter is equal to the threshold value representing the time period such that:
   in response to the next shift time being less than the query parameter, the customer wait time is determined based on the number of logged agents, the number of unlogged agents, and the next shift time, and
   in response to the next shift time being greater than the query parameter, the customer wait time is determined based on the number of logged agents and is not determined based on the number of unlogged agents.

5. The system of claim 1, wherein the customer wait time is determined by a method that can be selected from the group consisting of probabilistic methods and deterministic methods.

6. The system of claim 1, wherein the work force optimization (WFO) software module is residing on the switch.

7. The system of claim 1, wherein the query includes a request for one or more skills associated with each of the unlogged agents of the next shift, the response to the query includes the one or more skills associated with each of the unlogged agents, and the software engine determines customer wait time based on the one or more skills associated with each of the unlogged agents.

8. The system of claim 1, further comprising a user interface coupled to the switch, the user interface capable of receiving the number of unlogged agents and the next shift time and transmitting the number of unlogged agents and the next shift time to the software engine such that the software engine determines the customer wait time.

9. A device for managing customer wait time at a call center, the device comprising:
   a switch having a software engine to determine the customer wait time for each of one or more callers;
   wherein the software engine transmits a query to a software module, the software engine receives a number of unlogged agents of a next shift and a next shift time in response to the query, and the software engine determines the customer wait time corresponding to each of the one or more callers based on a number of logged agents and conditionally based on the number of unlogged agents and the next shift time, wherein the number of unlogged agents and the next shift time are included in the determination of the customer wait time based on a result of a comparison of the next shift time and a query parameter, the query parameter being equal to a threshold value representing a time period and stored by the software engine.

10. The device of claim 9, wherein the switch includes one or more communication interfaces coupled to a communication network.

11. The device of claim 9, wherein the query parameter is equal to the threshold value representing the time period such that:
in response to the next shift time is less than the query parameter, the customer wait time is determined based on the number of logged agents, the number of unlogged agents, and the next shift time when the next shift time is less than the query parameter, and
in response to the next shift time being greater than the query parameter, the customer wait time is determined based on the number of logged agents and is not determined based on the number of unlogged agents.

12. The device of claim 9, wherein the customer wait time is determined by a method that can be selected from the group consisting of probabilistic methods and deterministic methods.

13. The device of claim 9, wherein the software module is residing on the switch.

14. The device of claim 9, wherein the query includes a request for one or more skills associated with each of the unlogged agents of the next shift, a response to the query received by the software engine includes the one or more skills associated with the unlogged agents, and the software engine determines customer wait time based on the one or more skills associated with the unlogged agents.

15. The device of claim 9, further comprising a user interface coupled to the switch, the user interface capable of receiving the number of unlogged agents and the next shift time and transmitting the number of unlogged agents and the next shift time to the software engine such that the software engine determines the customer wait time.

16. The device of claim 9, further comprising a customer communication interface that communicates the corresponding customer wait time to each of the callers.

17. A method for managing customer wait time at a call center, the method comprising:
transmitting a query, by a software engine residing on a switch, to a software module;
receiving a number of unlogged agents of a next shift and a next shift time in response to the query by the software engine; and
determining, by the software engine, the customer wait time corresponding to each of one or more callers based on a number of logged agents and conditionally based on the number of unlogged agents and the next shift time, wherein the number of unlogged agents and the next shift time are included in the determination of the customer wait time based on a result of a comparison of the next shift time and a query parameter, the query parameter being equal to a threshold value representing a time period and stored by the software engine,
wherein the switch causes the corresponding customer wait time to be communicated to each of the callers.

18. The method of claim 17, wherein the software engine includes the query parameter equal to the threshold value representing a time period such that:
in response to the next shift time being less than the query parameter, the customer wait time is determined based on the number of logged agents, the number of unlogged agents, and the next shift time, and
in response to the next shift time being greater than the query parameter, the customer wait time is determined based on the number of logged agents and is not determined based on the number of unlogged agents.

19. The method of claim 17, further comprising:
querying the software module by the software engine for one or more skills associated with each of the unlogged agents of the next shift;
receiving a response to the query received by the software engine that includes the one or more skills associated with of the unlogged agents; and
determining the customer wait time based on the one or more one or more skills associated with the unlogged agents by the software engine.

\* \* \* \* \*